(12) United States Patent
Wilkinson et al.

(10) Patent No.: US 9,619,495 B2
(45) Date of Patent: Apr. 11, 2017

(54) SURROGATE KEY GENERATION (75) Inventors: William Kevin Wilkinson, San Mateo, CA (US); Alkiviadis Simitsis, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1419 days.

(21) Appl. No.: 13/175,613

(22) Filed: Jul. 1, 2011

(65) Prior Publication Data
US 2013/0003965 A1 Jan. 3, 2013

(51) Int. Cl.
*G06F 17/30* (2006.01)
(52) U.S. Cl.
CPC .. *G06F 17/30303* (2013.01); *G06F 17/30563* (2013.01); *G06F 17/30569* (2013.01); *G06F 17/30575* (2013.01)
(58) Field of Classification Search
None
See application file for complete search history.

(56) References Cited

U.S. PATENT DOCUMENTS

| 7,779,042 B1* | 8/2010 | Bland et al. ............... 707/802 |
| 2009/0089560 A1* | 4/2009 | Liu et al. .................. 712/226 |

\* cited by examiner

*Primary Examiner* — Alex Gofman
*Assistant Examiner* — Umar Mian
(74) *Attorney, Agent, or Firm* — Fabian VanCott (57) ABSTRACT

A method for surrogate key generation performed by a physical computing system includes creating a lookup record for a production key of an input record, a key of the lookup record including the production key and a value of the lookup record including both a record identifier for the input record and a unique identifier of the production key within the input record. The method further includes sending the lookup record to a first node of a distributed computing system, the first node determined by hashing the production key with a first hash function, and with the first node, determining a surrogate key for the production key.

20 Claims, 5 Drawing Sheets

SURROGATE KEY GENERATION

BACKGROUND

Organizations that store large amounts of data utilize database systems to manage that data. One type of database system is a data warehouse. A data warehouse is a collection of data that is structured to allow for analytical and reporting tasks. Such analytical tasks can provide decision makers with significant information. The structure of data within a data warehouse is in contrast to the structure of data within operational databases which are structured to support transactional operations for day-to-day business operations such as sales, inventory control and accounting.

An Extract, Transform, and Load (ETL) process is performed to transfer data that is formatted for operational tasks to data that is formatted for the analytical tasks associated with a data warehouse. This process involves extracting data from multiple sources. The data from these multiple sources may be formatted differently or include irrelevant details. Additionally, the data may have errors or inconsistencies that should be changed. Thus, the data will have to be transformed for data warehouse operations. Finally, the corrected and transformed data is loaded into the data warehouse.

One task of the ETL process is a surrogate key generation process. Objects within various sources of data such as customers are identified by production keys. For example, an object such as a particular customer may be identified by a production key such as a customer identification number. Furthermore, different sources of data may represent a single object using different production keys. For example, one source may represent a customer with a customer name while another source may represent that customer with a customer identification number. Thus, part of the ETL process is to replace each production key with a generated surrogate key so that all of the objects within the multiple sources of data are identified using the same key.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, the ETL process includes a surrogate key generation process that replaces production keys with surrogate keys. In some cases, an organization may need to process extremely large amounts of data. Thus, the process of replacing the production key for each object within that large collection of data can be very time consuming.

In light of this and other issues, the present specification discloses methods and systems for efficiently executing the process of replacing production keys with surrogate keys. The input of such methods or systems is an input record that includes a number of production keys and data associated with those production keys. An input record may correspond to one entry within a database. For example, if an input record represents a customer purchase, then the production keys for that input record may represent the customer name, the product name purchased by that customer, the store where that product was purchased, the purchase date, etc. The output of such methods or systems is an output record wherein the production keys of the input record have been replaced with surrogate keys. For example, the customer name production key may be replaced with the customer surrogate key.

According to certain illustrative examples, the task of replacing surrogate keys with production keys can be split up into smaller sub-tasks. The sub-tasks are then sent out to multiple nodes of a distributed computing system to be processed in parallel. A distributed computing system can be used to perform complex processes by dividing up processing tasks and sending those tasks out to multiple computing systems to be processed in parallel. By performing the surrogate key generation process in parallel, the process can be done more efficiently. Typically, the surrogate key generation process is done serially and separately.

To split up a task for processing on multiple nodes in parallel, key-value records that are formatted as key value pairs are used. A key-value pair is a tuple of two values. One value is the key which identifies an attribute. The other value is some data that may be associated with the key. In this case, the key is used to determine to which node within a distributed computing system the key-value record should be sent. The value of the key-value record may then be used for subsequent processing.

To generate surrogate keys in parallel, a key-value record is created for each production key within an input record. These key-value records will be referred to as the lookup records. A lookup record includes as its key, a single production key. The lookup record includes as its value, a record identifier that uniquely identifies the input record. One example of a record identifier may be a record number. The value also includes a unique identifier for that production key such as the ordinal number of that production key within the input record. Each lookup record is then sent to a different node to lookup the surrogate key for the corresponding production key.

The node to which a lookup record is sent is determined by performing a hash function on the production key of that lookup record A hash function is a mathematical function that is applied to a value and results in a smaller value. The smaller value can then used as an index. In this case, the result of the hash function indexes a particular node within the set of available nodes. The indexed node is thus the node to which the lookup record will be sent.

At each node that receives a lookup record, a lookup task will be performed on the production key of that received lookup record. The lookup task will refer to a mapping table that correlates production keys with surrogate keys. If the mapping table has no entry for a particular production key, a new, unique surrogate key is generated for that production key. A new entry is then added to the mapping table for that production key. Each node does not have to store a mapping table that correlates every production key to its surrogate key. Rather, each node can store a table that includes only a subset of the production keys. Specifically, the node may only store a mapping table that includes the production keys that will be sent to that node when the above mentioned hash function is performed on those production keys.

After the node has performed the lookup task, a new key-value record is generated. This key-value record will be referred to as an assembly record. The assembly record will then have as its key, the record number of the input record. The value of the assembly record may then be the surrogate key as well as the unique identifier for the corresponding production key. The assembly record is then sent to a further node to be combined with the other surrogate keys that replace production keys of the input record. The node to which the assembly record is sent will be referred to as the assembly node.

The assembly node for a particular input record is determined by performing a second hash function on the input record number. Thus, no matter which node is used to process a particular lookup record for an input record, all surrogate keys for that input record will be sent to the same node to assemble the output record. The output record may either remain on that node or it may be sent to another node for further processing or storage The assembly node creates an output record that is similar to the input record. The difference is that the output record will use the surrogate keys to identify objects rather than the production keys that are used to identify objects within the input record. The particular order of keys and data within the output record may depend on the particular application using the input record. The assembly node can create an output record that is in any ordering.

Through use of methods and systems embodying principles described herein, the process of replacing production keys with surrogate keys can be done much more effectively and within substantially less time. This will increase the efficiency of performing ETL tasks that involve generation of many surrogate keys for a single input record or for a large set of input records.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
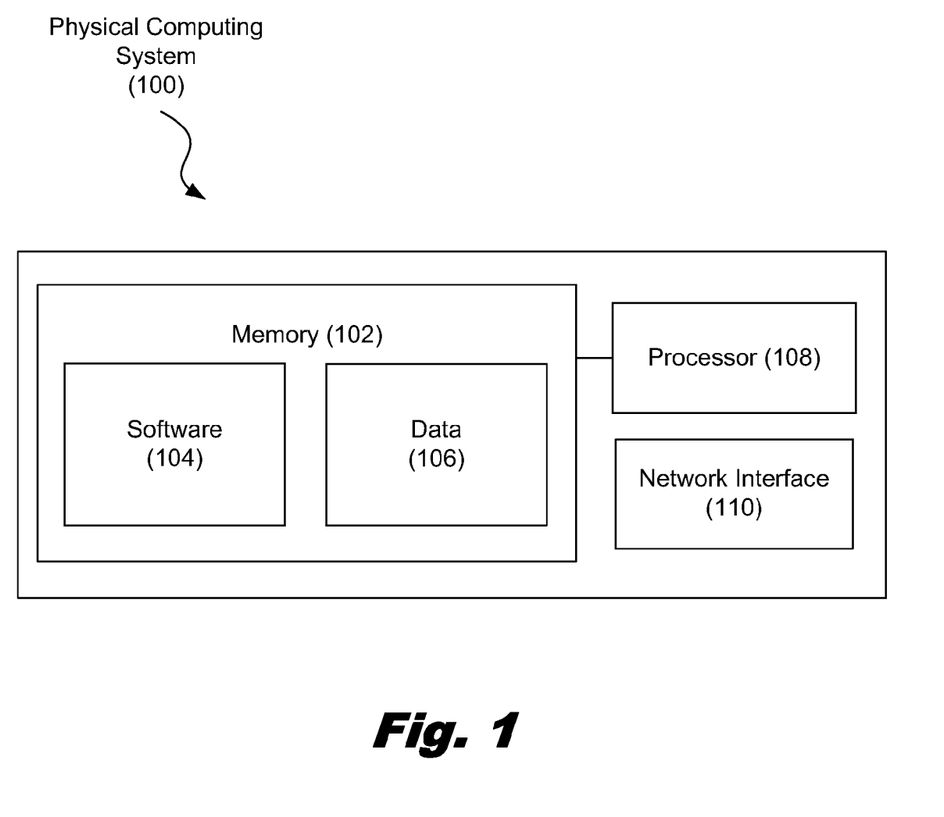
FIG. 1 is a diagram showing an illustrative physical computing system, according to one example of principles described herein.

Referring now to the figures, FIG. 1 is a diagram showing an illustrative physical computing system (100) that may be used as a node within a distributed computing system. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system.

A network interface (110) may provide a means for the physical computing system to communicate with other computing systems over a network. The network interface (110) may communicate over physical media such as Ethernet, coaxial, and fiber optic cables. Additionally, the network interface may communicate over wireless media by transmitting modulated electromagnetic waves and receiving such waves from other computing devices.

Figure 2:
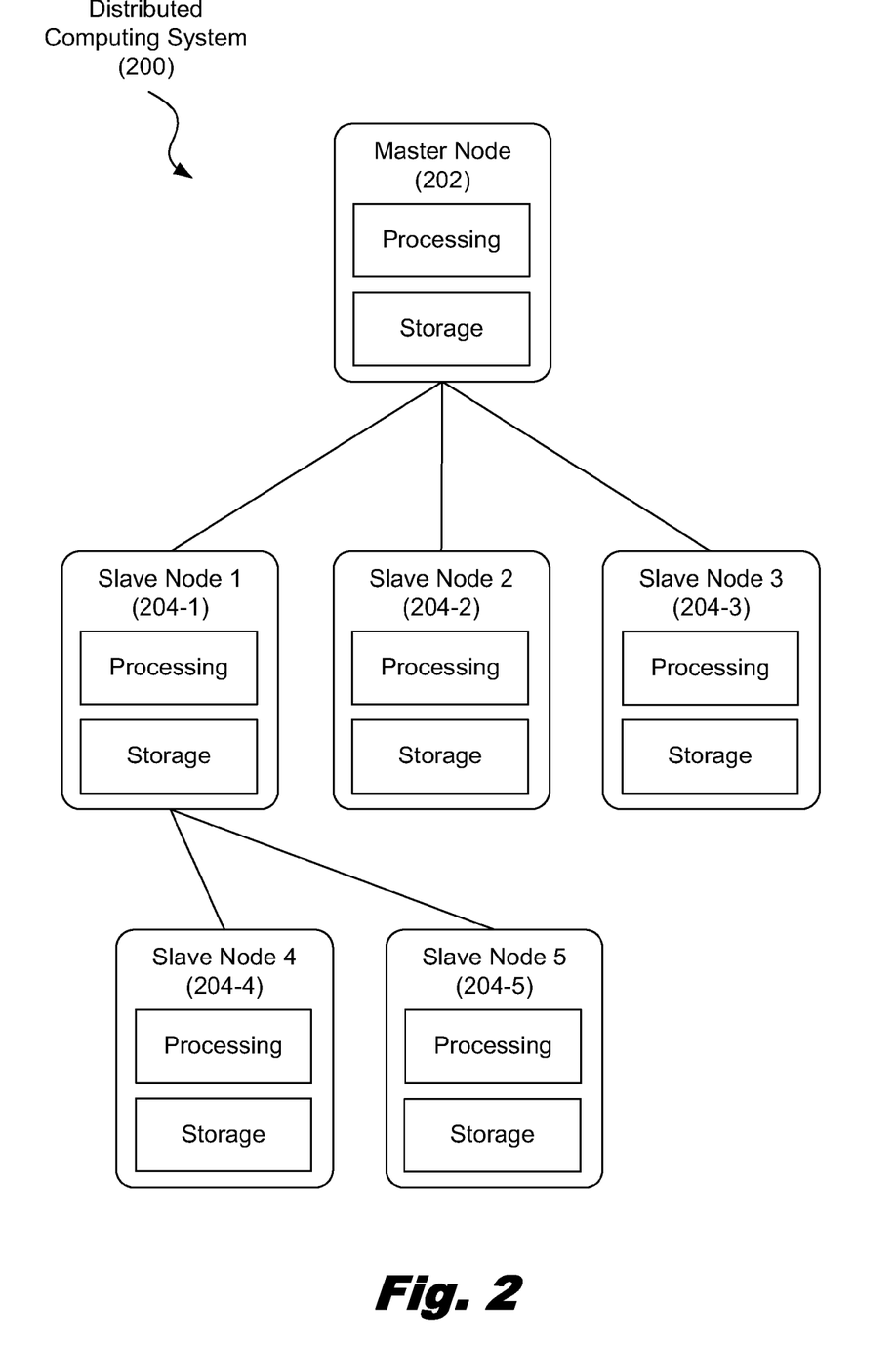
FIG. 2 is a diagram showing an illustrative distributed computing system, according to one example of principles described herein.

FIG. 2 is a diagram showing an illustrative distributed computing system (200). According to certain illustrative examples, a distributed computing system includes a master node (202) and a number of slave nodes (204). Both the master node and the slave nodes may be capable of both processing data and storing data.

The master node (202) is responsible for breaking up a processing job into several smaller processing jobs. Each of the smaller jobs is then sent to a slave node (204) for processing. For example, a master node may receive a processing task that is to be performed by the distributed processing system (200). The master node may then break that task into three sub-tasks. Each of those sub-tasks will then be sent to one of three slave nodes (204-1, 204-2, 204-3).

Upon receiving a sub-task from the master node (202), a slave node (204) will then perform its assigned processing job. The slave node may then either send the processing result back to the master node or onto a further node for storage. In some cases, a slave node (204-1) may further divide its assigned processing jobs into multiple jobs and distribute those jobs further to other slave nodes (204-4, 204-5). Those slave nodes (204-4, 204-5) may then perform their assigned tasks. The slave nodes (204-4, 204-5) may then send the result back to the assigning slave node (204-1) or to a different location for storage. The node to which a result is sent to may be based on the data being processed.

Figure 3:
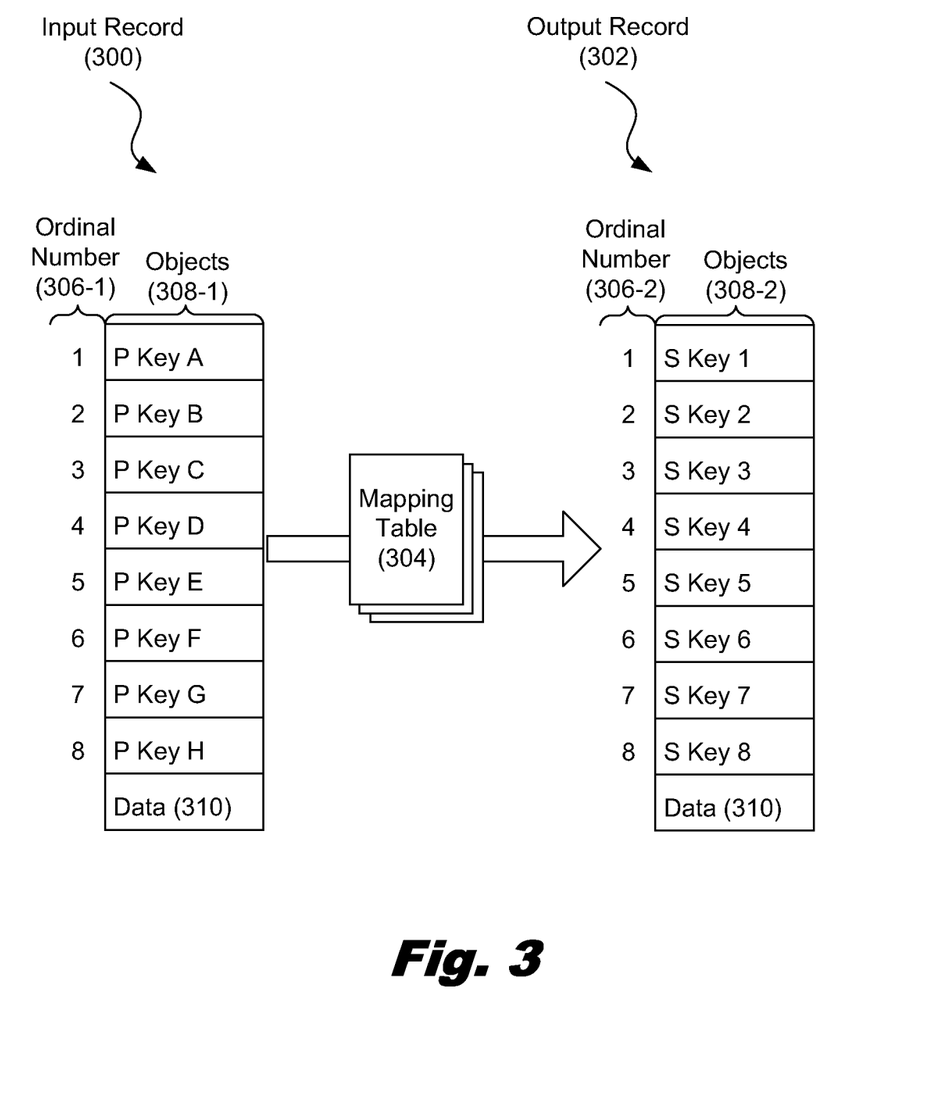
FIG. 3 is a diagram showing an illustrative input record and an output record, according to one example of principles described herein.

FIG. 3 is a diagram showing an illustrative input record (300) and an output record (302). As mentioned above, the process of replacing production keys within surrogate keys involves an input record (300) and an output record (302). The output record (302) includes the same objects (308) from the input record (300). However, the objects (308-2) within the output record (302) are identified with surrogate keys while the objects (308-1) within the input record (300) are identified using production keys. The process of replacing the production keys with surrogate keys is done by looking up each production key in a mapping table (304) to find the corresponding surrogate key for that production key. Conceptually, there is a separate mapping table for each key mapping (production-surrogate key relationship).

After the process of replacing the production keys with the surrogate keys is complete, the objects (308-2) within the output record (308) may remain in the same order as they were in the input record (300). FIG. 3 illustrates a number by each object within the records. This number represents the ordinal number (306) of each object. However, the ordinal number (306) is not an explicit value stored with each production key. Rather it is an inherent characteristic of the objects based on the way the production keys within the input record (300) is stored. The master node that divides an input record into multiple key-value pairs will determine this ordinal number for each production key based on where that production key lies within the input record (300). The order of keys and data in the output record is application-specific. In one example, the ordinal number of the production key within the input record may be used to order the objects within the output record.

In some cases, there is not a one-to-one relationship between production keys and surrogate keys. For example, different production keys within the input record (300) may be represented by the same surrogate key within the output record (302). For example, a customer surrogate key may be generated from a combination of a productions key for a customer name and a production key for a customer phone. Thus, the total number of objects represented by surrogate keys within the output record (302) may be different than the total number of objects represented by production keys within the input record (300).

The input record (300) also includes data (310) that is not associated with any of the production keys. This data (310) is not relevant to the surrogate key generation process. As will be described in more detail below, the data (310) may be separated from the objects represented by production keys during this surrogate key replacement process and then joined with those objects now represented by surrogate keys when that replacement process is complete.

As mentioned above, the process of looking up the appropriate surrogate key for each production key can be an extremely time consuming task. This is particularly the case when there are millions or billions of objects within multiple input records that need to be processed. This is especially time consuming as the process is typically done serially and separately. For example, for an input dataset of customer purchase records, the computing system would have to first replace all the customer name production keys for each input record within the dataset. Then, the system would have to replace all the product name production keys for each input record within the dataset. This process would then continue for each production key of the input records within that dataset. In light of this issue, the present specification discloses a method of performing this lookup process in a parallel manner on a distributed computing system.

Figure 4:
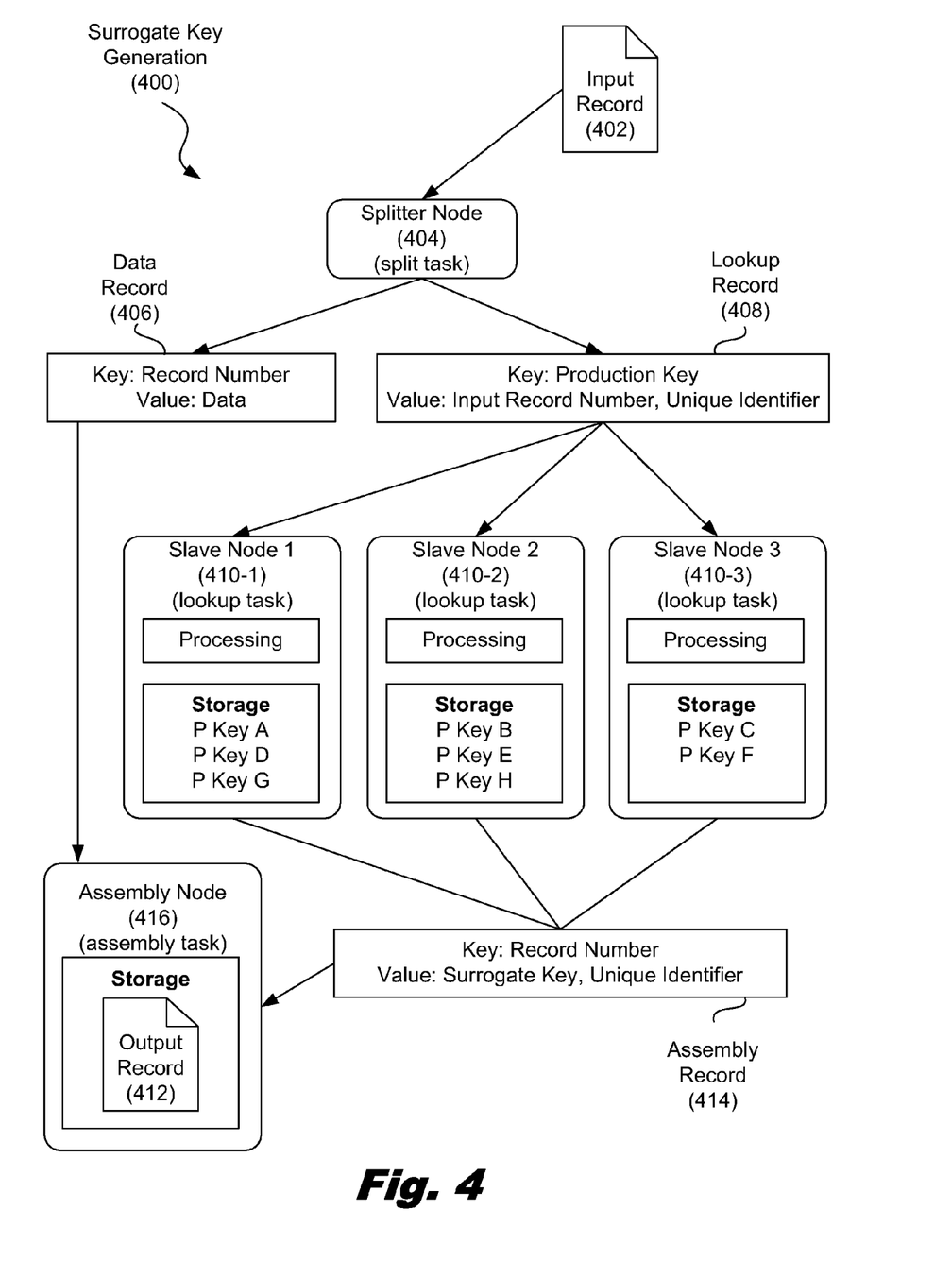
FIG. 4 is a diagram showing an illustrative surrogate key mapping process, according to one example of principles described herein.

FIG. 4 is a diagram showing an illustrative surrogate key generation process (400). The following description will describe the process of replacing production keys with surrogate keys on a single input record on a distributed computing system. However, a system embodying principles described herein can perform this operation on multiple input records.

Various paradigms can be used to process data on distributed computing systems. One such paradigm is a map-reduce process. The map-reduce process is a two step process that includes a map step and a reduce step where either step is optional. One example of a map-reduce processing engine is an open-source software platform called Apache™ Hadoop™. For purposes of explanation, the following process will be described in terms of a map-reduce paradigm. However, methods and systems for surrogate key generation embodying principles described herein may use any type of distributed computing processing paradigm that provides the ability to spread computation in parallel across a number of processing nodes. The distributed computing system should also provide the ability for any node to communicate with other nodes as well as provide both temporary and persistent data storage.

Surrogate key generation using a map-reduce paradigm involves the use of two map steps and one reduce step. In this example, the input data set that includes multiple input records is stored on a single node. However, it may be the case that the input data set is distributed across multiple nodes. As was illustrated in FIG. 3, each input record in the input data set comprises a number of production key values and a number of data values. In order to extract the production keys and data from each input record, it is assumed that either the structure of input records is fixed and known in advance or that the input records are encoded so that the individual fields are self-identifying.

The first map task within the surrogate key generation process involves dividing the task of looking up a surrogate key for each production key within an input record into smaller lookup sub-tasks. According to certain illustrative examples, a splitter node (404) receives an input record (402). In this example, the input record (402) corresponds to the input record (300) illustrated in FIG. 3. The splitter node (404) will divide the task of looking up the surrogate key for each production key into multiple sub-tasks. Each sub-task corresponds to a lookup record. The key within the lookup record is the production key that is to be looked up in the mapping table and replaced with the appropriate surrogate key. The value within the lookup record includes the input record number and a unique identifier. The record number uniquely identifies the input record (402). The unique identifier uniquely identifies the particular type of production key (customer name, product, etc.) and is used to select the appropriate mapping table in the lookup task. An example of a unique identifier is an ordinal number.

The data not associated with production keys within the input record (402) is not involved with the lookup process. Thus, this data does not need to be sent to individual lookup nodes. Therefore, the splitter node (404) creates a key-value record which will be referred to as a data record (406). The data record (406) has as its key, the record number identifying the input record. The value for the data record (406) is any data within the input record that is not a production key required for surrogate key generation. In some cases, the data within the data record may include production keys if such production keys are not to be replaced with surrogate keys. Various applications may not have to replace some production keys with surrogate keys.

After the splitter node (404) divides the task of replacing production keys with surrogate keys into sub-tasks, it is then determined on which node each of those sub-tasks will be processed. In order to determine the node to which a lookup record will be sent, a hash function is applied to the production key of that lookup record. As mentioned above, a hash function is a mathematical function that takes a larger value and reduces it into a smaller value. The smaller value can then be used to index a particular set of nodes. Thus, the result of the hash function applied to the production key will determine where the lookup record will be sent.

When a lookup record arrives at its assigned node, a lookup task will be performed for the production key of that lookup record. This lookup task is the second mapping step within the map-reduce paradigm. The lookup task will refer to a mapping table that corresponds to that node. The mapping table that corresponds to a particular node does not need to include a map of every production key to its corresponding surrogate key. Rather, the mapping table that corresponds to a particular node may only maintain mapping data for the production keys that will be sent to that node as a result of the above mentioned hash function. Using the input record illustrated in FIG. 3, production keys A, D, and G correspond to slave node 1 (410-1), production keys B, E, and H correspond to slave node 2 (410-2), and production keys C and F correspond to slave node 3 (410-3). The mapping table that corresponds to a particular node may be stored directly on that node for quicker access.

There may be multiple mapping tables on each lookup node. For example, there may be one mapping table for each type of production key that is sent to that node as a result of the hash function. In one example, the unique identifier of the production key may be used to select the appropriate mapping table. In some cases, it may be possible to use a single mapping table for all production keys that will be hashed to a particular node as long as there is a mechanism for distinguishing those keys.

If there is a pre-created mapping table that contains mapping of production keys to surrogate keys, then this mapping table can be split and placed on the several slave nodes (410). In order to split this pre-created mapping table appropriately so that the mapping table of each node includes the production keys that will be sent there as a result of the hash function, a mapping table placement process may be performed wherein that hash function is applied to each production key within the entire mapping table. Each production key and its associated surrogate key will then be sent to the mapping table of the appropriate node based on a result of that hash function.

It may be the case that when a node is performing a lookup task for a production key of a received lookup record, it will be determined that that production key is not within the mapping table corresponding to that node. In this case, the node will generate a new surrogate key for that production key. The mapping table may then be updated with that newly generated surrogate key. Thus, when the next lookup record comes to that node with that same production key, it will find the appropriate surrogate key within the mapping table corresponding to that node.

After the slave node has performed the lookup task, it will create a new key-value record (414). This new key-value record will be referred to as an assembly record. The assembly record will have as its key, the record number that was part of the value of the corresponding lookup record (408). The value of the assembly record will be the appropriate surrogate key that replaces the production key as well as the unique identifier that identifies the production key within the input record. The value may optionally include the original production key if that value is used for subsequent processing of the input record.

It is then determined where the assembly record should be sent. Because all assembly records for a particular input record should be sent to the same place, the node (412) to which the assembly record should be sent is based on a second hash function applied to the record number. This second hash function will also be applied to the record number within the data record (406). The result of the hash will then be used to index the node to which the key-value record will be sent. The node to which each of the key-value records for a particular input record are sent will be referred to as the assembly node. On the assembly node, the key-value records are assembled to form the output record (412). The order of fields in the output record is application-specific. The unique identifier of the production key in the assembly record can be used to influence that order. The data record may also contain in its data value an ordinal number that is used for ordering.

At the assembly node, the assembly records and the data record can be combined to produce the output record. This assembly step corresponds to the reduce step within the map-reduce paradigm. The reduce step completes the process of replacing production keys within surrogate keys through use of a parallel computing process. Each input record that is processed in the above described manner may be sent to a different assembly node. Thus, the output records of an output record dataset are distributed across multiple nodes.

In one example, the lookup record corresponds to production key C within the input record. Thus, the lookup record will have as its key, production key C. As its value, it will have the record number for input record 1 and the ordinal number for production key C. Referring to FIG. 3, if the unique identifier is an ordinal number, then the ordinal number for production key C is the value 3. When the first hash function is applied to production key C, it will be determined that the lookup record (408) should be sent to slave node 3 (410-3). When the lookup record (408) arrives at slave node 3 (410-3), that node will perform the lookup task and find the surrogate key that corresponds to production key C. The assembly record (414) will then have as its key, the record number for input record 1 (402). The value will then include the appropriate surrogate key for production key C as well as the ordinal number for which that surrogate key will be placed within the output record (412). In this example, the output record corresponds to the output record (302) illustrated in FIG. 3.

For purposes of illustration, the number of productions keys in each input record is displayed as being equal to the number of surrogate keys. However, there is not necessarily such a one-to-one relationship. In some cases, several production keys may be used for a single surrogate key. For example, a surrogate key for a date may use three individual production keys, one for the month, one for the day, and one for the year. In a further example, a customer may be uniquely identified through a name and a telephone number. Thus, the two production keys representing the customer name and customer phone number may be replaced with a single surrogate key. The exact mapping of production keys to surrogate keys will depend on the application using the data within an input record dataset. The surrogate key generation process embodying principles described herein may support arbitrary mappings. For example, to support a compound customer key (e.g., name and phone), the splitter node (404) may combine production keys into a compound key value in the lookup record.

Furthermore, although the above description illustrates the splitting task being performed by a single splitter node, it may be the case that the input dataset is partitioned across multiple nodes of the distributed computing system. In such cases, the splitter map task can run in parallel across all nodes that have a partition of the input dataset. Additionally, the above description illustrates the case where the output dataset resides as a partitioned dataset across multiple assembly nodes. However, in some cases, the output records that are distributed across multiple assembly nodes may be combined and stored as a complete file that includes the entire output record dataset. In some cases, the original input order of the input dataset may be restored. In this case, the output records would have to be sorted on the input record number before creating a single output file.

Figure 5:
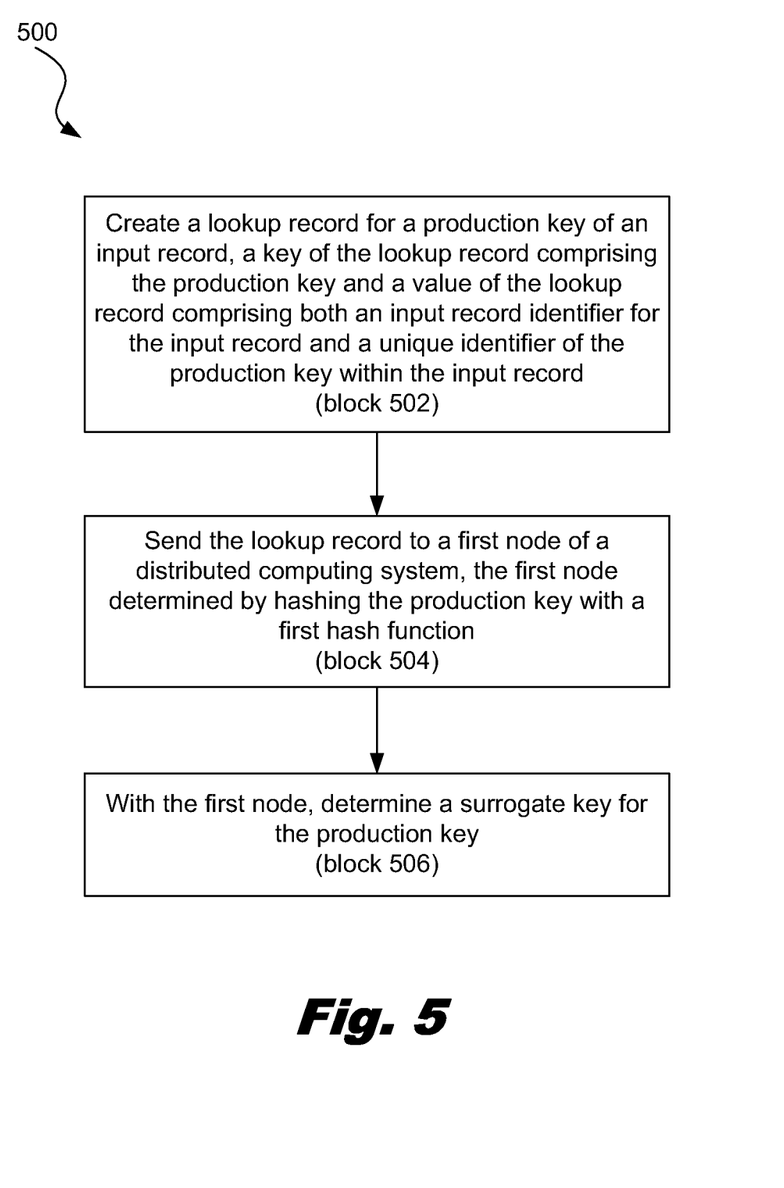
FIG. 5 is a diagram showing an illustrative surrogate key replacement process, according to one example of principles described herein.

FIG. 5 is a diagram showing an illustrative surrogate key replacement process (500). According to certain illustrative examples, the method includes creating (block 502) a lookup record from an input record. A key of the lookup record comprises a production key of the input record and a value of the lookup record comprises both a record number for the input record and a unique identifier of the production key within the input record. The method further includes sending (block 504) the lookup record to a first node of a distributed computing system, the first node determined by hashing the production key with a first hash function, and with the first node, determining (block 506) a surrogate key for the production key.

In conclusion, through use of methods and systems embodying principles described herein, the process of replacing production keys with surrogate keys can be done much more effectively and within substantially less time. This will increase the efficiency of performing ETL tasks that involve generation of many surrogate keys for a single input record . . . .

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for massively parallel surrogate key generation performed by a physical computing system, the method comprising:
    creating a lookup record for a production key of an input record, a key of said lookup record comprising said production key and a value of said lookup record comprising both an input record identifier for said input record and a unique identifier of said production key within said input record;
    sending said lookup record to a first node of a distributed computing system, said first node determined by hashing said production key with a first hash function; and
    with said first node, determining a surrogate key for said production key.

2. The method of claim 1, further comprising, with said first node, creating an assembly record, a key of said assembly record comprising said input record identifier, and a value of said assembly record comprising both said surrogate key and said unique identifier.

3. The method of claim 2, further comprising, with said first node, sending said assembly record to a second node determined by hashing said input record identifier of said assembly record with a second hash function.

4. The method of claim 3, further comprising, assembling said assembly records to form an output record.

5. The method of claim 3, further comprising, forming a data record, a key of said data record comprising said input record identifier and a value of said data record comprising data within said input record.

6. The method of claim 5, further comprising, sending said data record to said second node based on hashing said input record identifier of said data key-value record with said second hash function.

7. The method of claim 1, wherein determining said surrogate key for said production key comprises performing a lookup task on a mapping table that correlates productions keys with surrogate keys.

8. The method of claim 7, wherein said mapping table is stored on said first node and includes only production keys associated with said first node based on said first hash function.

9. The method of claim 8, further comprising:
    generating a new surrogate key for said production key if said production key is not already associated with a surrogate key; and
    updating said mapping table with said new surrogate key.

10. The method of claim 1, wherein processing said production key is done in parallel with a processing of other production keys of said input record across other nodes, each of said other nodes sending said other production keys having been replaced with surrogate keys to said second node.

11. A distributed computing system comprising:
    a master node comprising:
        at least one processor; and
        a memory communicatively coupled to the at least one processor, the memory comprising computer executable code that, when executed by the at least one processor, causes the at least one processor to:
            create a lookup record for a production key of an input record, a key of said lookup record comprising said production key and a value of said lookup record comprising both a record identifier for said input record and a unique identifier of said production key within said input record;
            send said lookup record to a first node of a distributed computing system, said first node determined by hashing said production key with a first hash function; and
        with computer executable code of said first node that, when executed by a processor of said first node, causes said processor of said first node to determine a surrogate key for said production key.

12. The system of claim 11, wherein said computer executable code of said first node, when executed by said processor of said first node, causes said processor to create an assembly record, a key of said assembly record comprising said input record identifier, and a value of said assembly record comprising both said surrogate key and said unique identifier.

13. The system of claim 12, wherein said computer executable code of said first node, when executed by said processor of said first node, causes said processor to send said assembly record to a second node, said second node determined by hashing said input record identifier of said assembly record with a second hash function.

14. The system of claim 13, wherein to determine said surrogate key for said production key, said computer executable code of said master node further causes said processor to perform a lookup task on a mapping table that correlates productions keys with surrogate keys, wherein said mapping table stored on said first node includes only production keys associated with said first node based on said first hash function.

15. The system of claim 13, wherein computer executable code of said second node, when executed by a processor of said second node, causes said processor of said second node to assemble assembly records from a plurality of nodes to produce an output record, said output record comprising a corresponding surrogate key for each production key in said input record as well as a data payload of said input record.

16. The system of claim 11, wherein said first node comprises computer executable code to perform a lookup task on a mapping table that correlates productions keys with surrogate keys.

17. The system of claim 16, wherein said mapping table is stored on said first node and includes only production keys associated with said first node based on said first hash function.

18. The system of claim 17, wherein said first node comprises computer executable code to:
    generate a new surrogate key for said production key if said production key is not already associated with a surrogate key; and
    update said mapping table with said new surrogate key.

19. The system of claim 11, wherein said at least one processor of said master node comprises computer executable code to create a separate lookup record for each of a plurality of production keys in said input record, wherein different lookup records are sent to different nodes of parallel processing based on hashing with said first hash function of production keys associated with respective lookup records.

20. A method for surrogate key generation performed by a distributed computing system, the method comprising:

with a distributed computing system, replacing a number of production keys of an input record with surrogate keys in parallel, for each of said production keys:

creating a lookup record for that production key, a key of said lookup record comprising that production key and a value of said lookup record comprises both a record identifier for said input record and a unique identifier of that production key within said input record;

sending said lookup record to a first node of a distributed computing system, said first node determined by hashing said production key with a first hash function;

with said first node, determining a surrogate key for said production key;

with said first node, creating an assembly record, a key of said assembly record comprising said input record identifier, and a value of said assembly record comprising both said surrogate key and said unique identifier; and     with said first node, sending said assembly record to a second node determined by hashing said input record identifier of said assembly record with a second hash function.

\* \* \* \* \*